United States Patent [19]
Tervamäki et al.

[11] Patent Number: 5,879,633
[45] Date of Patent: Mar. 9, 1999

[54] RATCHET PIPETTE

[75] Inventors: Jukka Tervamäki, Helsinki; Tapani Pullinen, Hyvinkää; Jouko Mikkonen, Helsinki; Kari Järvimäki, Espoo, all of Finland

[73] Assignee: Labsystems Oy, Helsinki, Finland

[21] Appl. No.: 834,267

[22] Filed: Apr. 15, 1997

[30] Foreign Application Priority Data

Apr. 15, 1996 [FI] Finland ..................................... 961649

[51] Int. Cl.⁶ ................................ B01L 3/02; G01N 1/14
[52] U.S. Cl. ........................ 422/100; 422/103; 436/180; 73/864.13; 73/864.14; 73/864.18
[58] Field of Search .......................... 422/99, 103, 100; 436/180; 73/864.11, 864.13, 864.16, 864.18, 864.14

[56] References Cited

U.S. PATENT DOCUMENTS

| | | | |
|---|---|---|---|
| 2,175,601 | 10/1939 | Grund | 222/323 |
| 2,942,603 | 6/1960 | Geyer | 604/224 |
| 3,615,240 | 10/1971 | Sanz | 422/100 X |
| 3,977,574 | 8/1976 | Thomas | 222/391 |
| 4,406,170 | 9/1983 | Kühn | 73/864.16 |
| 4,929,428 | 5/1990 | Tezuka | 422/100 |
| 5,330,721 | 7/1994 | Tervamäki | 422/100 |
| 5,364,596 | 11/1994 | Magnussen, Jr. et al. | 422/100 |

FOREIGN PATENT DOCUMENTS

| | | |
|---|---|---|
| A-931650 | 10/1993 | Finland . |
| A-2926691 | 6/1981 | Germany . |
| 2 109 690 | 6/1983 | United Kingdom . |
| WO 84/04056 | 10/1984 | WIPO . |

OTHER PUBLICATIONS

Instruction Manual for Stepper 411 pipette manufactured by Socorex ISBA S.A. Believed to be published prior to 1995.

*Primary Examiner*—Harold Y. Pyon
*Attorney, Agent, or Firm*—Pennie & Edmonds LLP

[57] ABSTRACT

The object of the invention is a ratchet wheel pipette having a body and in it a cylinder (3) and a piston (12) and a filling and dispensing arrangement to draw liquid into the cylinder and to dispense it in smaller portions with the aid of the piston. The pipette has a push rod (11) as an extension of the piston, a transmission wheel (6) in mesh with the push rod, a ratchet wheel (5) having a larger diameter than the transmission wheel and rotating with it and having a peripheral engaging surface, such as gears, and, journaled on the same shaft as the ratchet wheel, a dispensing lever (9) which is movable between an upper position and a lower position and with an attached pawl (10) engaging the engaging surface of the ratchet wheel, so that when the dispensing lever moves downwards, beginning at a certain point of the movement, the pawl engages the engaging surface of the ratchet wheel and forces the ratchet wheel and thus also the transmission wheel to rotate, and so that when the dispensing lever moves upwards the pawl does not rotate the ratchet wheel. The pipette can be used in laboratories, for instance to dispense samples or reagents.

18 Claims, 4 Drawing Sheets

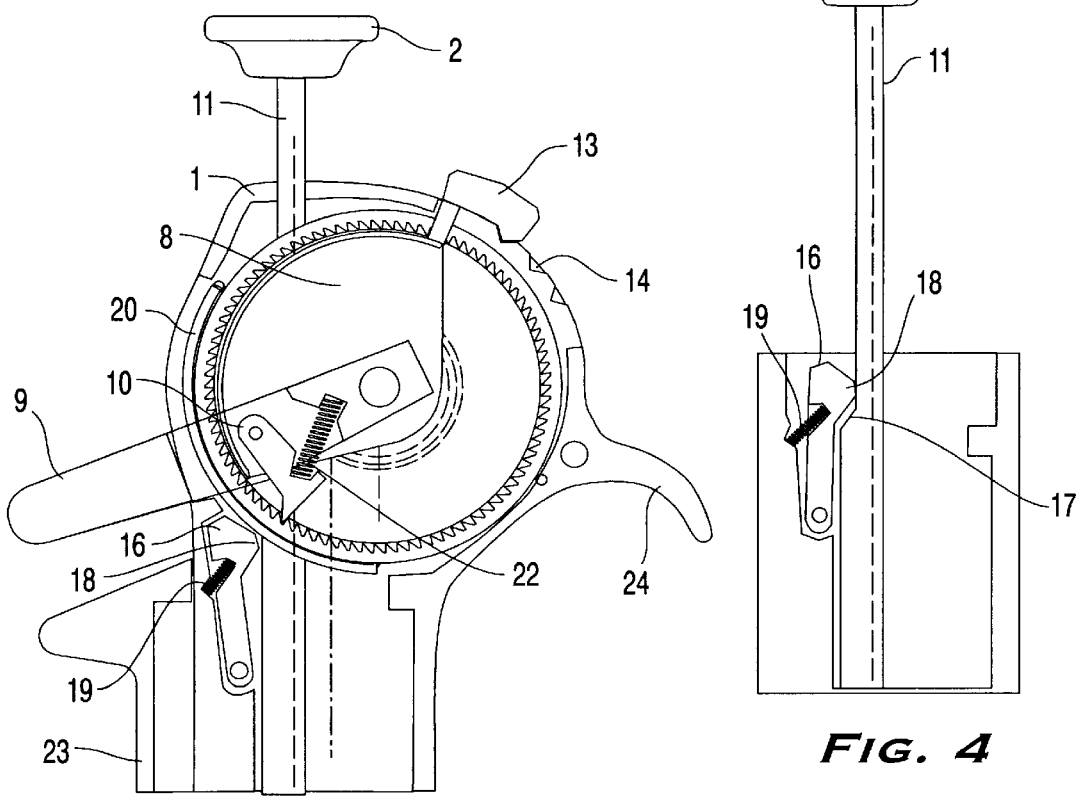
FIG. 3
FIG. 4
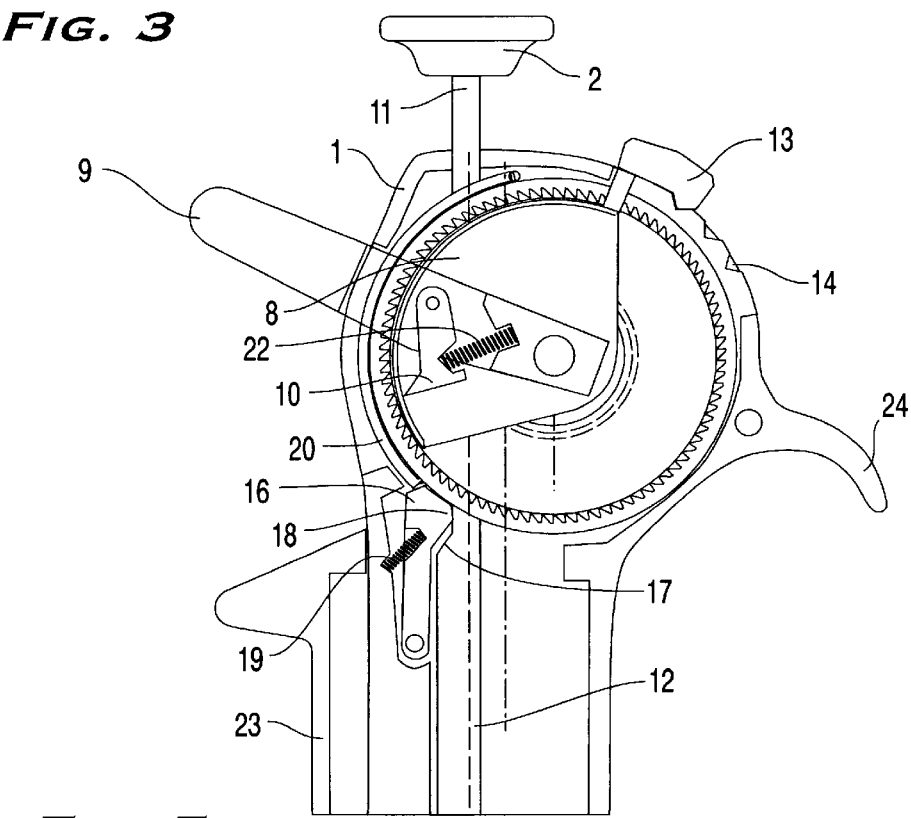
FIG. 5

RATCHET PIPETTE

TECHNICAL FIELD

The invention relates to techniques for handling of liquids and concerns a stepping pipette with which liquid drawn into the pipette can be dispensed in several smaller portions. Particularly the invention concerns a stepping pipette having a ratchet wheel and a pawl engaging the wheel, as well as a transmission wheel rotating with the ratchet wheel and moving the piston of the pipette. The pipette can be used in laboratories, e.g. to dispense samples or reagents.

BACKGROUND OF THE INVENTION

Such pipettes are known as comprise a piston movable in a cylinder, a longitudinal pinion rack on the piston shaft, and a pawl engaging the pinion rack due to the force of a spring. The pawl is connected to an operating member with which the pawl is forced to move the upwards pulled pinion rack and thus also the piston downwards in steps with a desired length. The length of the step can also be adjusted by a cover plate movable on or on the side of the pinion rack or by a pawl lifter, which determines the position where the downwards moving pawl engages the pinion rack. Such pipettes are presented for instance in the publications DE-A-2926691, FI-A-844096 and FI-A-931650.

On the market there has also been a stepping pipette (Socorex Stepper 411) having a ratchet wheel and a co-operating pawl journaled on a separate shaft, and a gearwheel rotating with the ratchet wheel and moving the piston of the pipette.

DESCRIPTION OF THE INVENTION

SUMMARY OF THE INVENTION

In the pipette according to the invention the piston has an extension in the form of a push rod, a transmission wheel in mesh with the push rod, a ratchet wheel having a larger diameter than the transmission wheel and rotating together with the transmission wheel and having a peripheral engaging surface, and, journaled on the same shaft as the ratchet wheel, a dispensing lever with an attached pawl engaging the engaging surface of the ratchet wheel. Due to the transmission ratio provided by the wheels even shorter piston strokes will be made as accurate as possible. Due to the location of the dispensing lever the construction is simple and compact. Preferably the push rod and the transmission wheel are geared, whereby the operation is absolutely accurate. Preferably also the engaging surface of the ratchet wheel is geared. Due to the transmission ratio it is not necessary, even for a short stroke, to make very small gears, which are difficult to manufacture, may operate unreliably and wear down in a relatively short time. Preferably the transmission wheel and the ratchet wheel are journaled concentrically.

The top end of the push rod can project through the upper part of the pipette, whereby the pipette is filled by pulling the rod. Alternatively a separate operating rod can engage the push rod via a wheel, whereby the pipette is filled by pushing the operating rod. The operating rod can be realised in a manner which is presented e.g. in the publications FI-A-790990, FI-A-844096 and FI-A-931650.

The pipette according to the invention can have a single channel or more channels, and it can be based on the air or liquid piston principle.

When the engaging surface of the ratchet wheel is on its inner periphery it results in as small a size as possible. A higher transmission ratio is obtained when the engaging surface is on the outer periphery.

The pipette can have a control member, with which it is possible to control the position where the pawl engages the engaging surface of the ratchet wheel. With this it is possible to control the length of the stroke.

A second object of the invention is a member to control the step volume of a ratchet wheel pipette so that the control member has a member peripherally movable on the engaging surface in order to release the pawl.

Further the pipette can comprise an arrangement to prevent the piston from moving downwards when a full stroke is not possible anymore. This could be realised for instance in a manner shown in the publication FI-931650.

A third object of the invention is an arrangement to prevent the last stroke of a stepping pipette, the preventing arrangement having in the body a preventing lever which turns to prevent the pawl of the dispensing lever from moving from its top position when the push rod has moved so far below that it cannot anymore move a full maximum stroke.

A fourth object of the invention is a stepping pipette in which the top end of the filling rod projects through the upper part of the pipette as a filling knob, to which is attached an appendage with which the pinion rack can be moved up and down by one hand when the pipette is filled. This facilitates the handling of viscous liquids.

BRIEF DESCRIPTION OF THE DRAWINGS

The enclosed drawings are a part of the detailed description. In the drawings:

FIG. 3 shows the ratchet mechanism of the pipette in FIG. 2 when the dispensing lever is in its bottom position;

FIG. 4 shows the ratchet mechanism of the pipette in FIG. 2 when the dispensing lever is in its top position and when a movement of the dispensing lever is prevented by the arrangement preventing the last stroke;

FIG. 5 shows a detail of the arrangement preventing the last stroke in the stepping pipette;

DETAILED DESCRIPTION OF THE INVENTION

Figure 1:
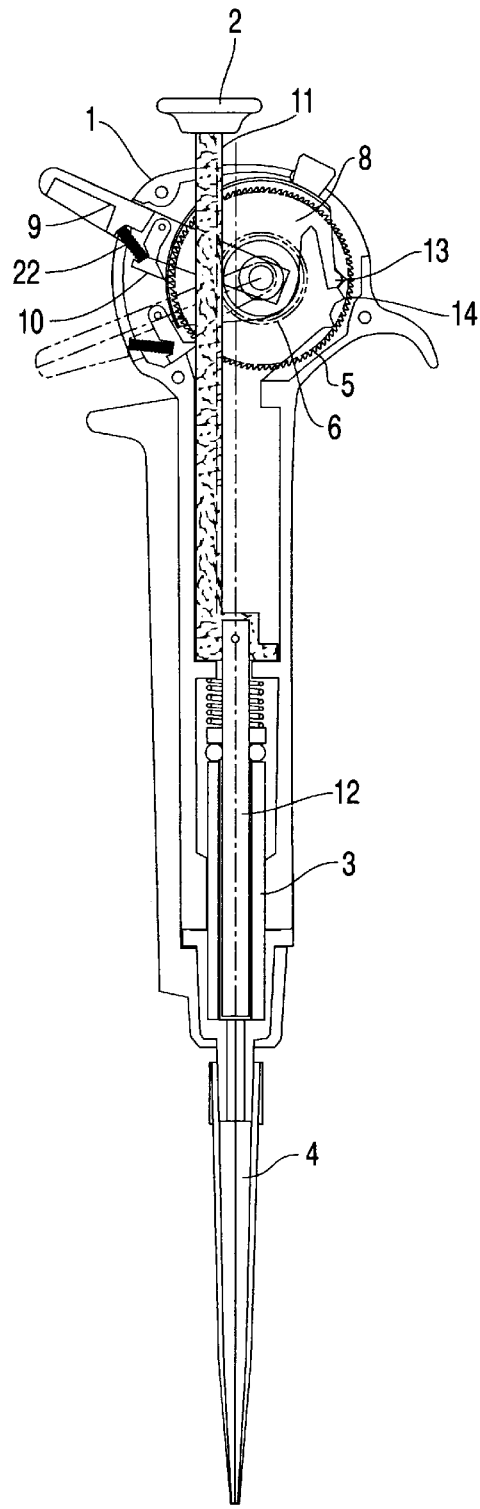
FIG. 1 shows a stepping pipette having a ratchet wheel with external gears.
Figure 2:
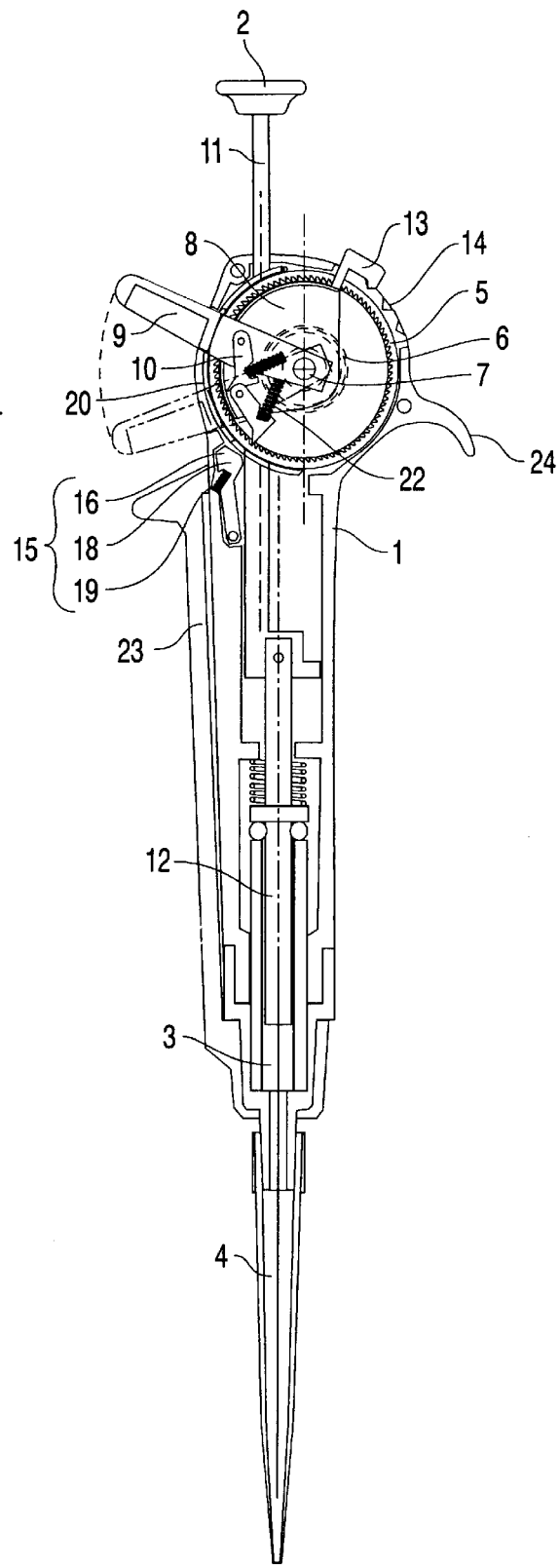
FIG. 2 shows a stepping pipette having a ratchet wheel with internal gears.

FIGS. 1 and 2 show stepping pipettes having an elongated body 1, a piston part 2, a cylinder 3 and a tip reservoir 4 attached to the bottom end of the cylinder. The body further includes a ratchet wheel 5, and rotating together with ratchet wheel a transmission wheel 6 with a smaller diameter and journaled on the same transverse shaft 7.

The ratchet wheel 5 has gears on the outer periphery (FIG. 1) or on the inner periphery (FIG. 2). A control member 8 is connected to the ratchet wheel.

Further a dispensing lever 9 is journaled on the shaft 7 apart from the ratchet wheel 5 and the transmission wheel 6.

A pawl 10 engaging the gears on the ratchet wheel is journaled on the dispensing lever. When the lever is pressed downwards the pawl engages the gears, so that the ratchet wheel and thus also the transmission wheel will rotate forced by the pawl. When the lever returns to its upper position the pawl moves freely over the gears, so that the wheels do not move. In order to ensure the engagement and the free movement the gears are suitably bevelled and the tip of the pawl is shaped corresponding to the gears. When the lever is its upper position the pawl is released from the gears and held by the control member 8.

The free end of the dispensing lever 9 projects through an elongated slit on the side of the body 1. The top and bottom of the slit determine the upper and the lower positions, respectively, of the lever.

The piston part 2 has a pinion rack 11 meshing with the transmission wheel 6. The upper part of the piston part projects through the top of the body 1, and it has a knob which facilitates gripping. A piston 12 in the cylinder 3 extends from the lower end of the pinion rack.

When it is desired to draw liquid into the pipette, the dispensing lever 9 is left in its raised position so that the pawl does not engage the ratchet wheel 5, and then the piston part 2 is pulled upwards. Then the piston 12 will create suction in the cylinder 3 and liquid will be drawn into the tip reservoir 4.

When it is desired to dispense liquid from the pipette, the dispensing lever 9 is pushed. Then, starting at a certain point of the movement, the pawl 10 engages the ratchet wheel 5 and forces it to rotate. Correspondingly, the transmission wheel 6 rotating together with the ratchet wheel forces the piston part 2 to move downwards, whereby the piston 12 creates pressure in the cylinder 3 and liquid is dispensed from the tip reservoir in an amount corresponding to the displacement of the piston. When the dispensing lever is pushed to its bottom position, the length of the stroke and thus also the displacement of the piston are exactly defined.

On the gears of the ratchet wheel 5 the control member 8 has a peripherally extending cylinder segment so that when the dispensing lever 9 is above a certain position then the pawl 10 is on the cylinder segment. The control member is concentrically and freely journaled on the same shaft 7 as the ratchet wheel 5. The cylinder segment extends in the direction of the shaft to the side of the ratchet wheel and it has a radial control knob 13, whose free end projects from an arcuate control slit in the body 1. The control knob has a resilient locking projection to one side and on the edge of the control slit there are corresponding notches 14. Thus the control member can be rotated by the control knob and locked in a certain position, which determines the position where the downwards moving pawl engages the ratchet wheel. Correspondingly this determines the rotation of the ratchet wheel and the piston stroke which correspond to one stroke.

The equipment shown in FIG. 2 has an additional feature in the arrangement 15 preventing a bottom stroke, which prevents the piston from doing its last possible stroke. The fact is that such a stroke often would be incomplete. The preventing arrangement has in the body a preventing lever 16 at the side of the pinion rack 11. The pinion rack has an inwardly directed step 17, so that when the pinion rack has moved downwards so far that it cannot move a full maximum stroke anymore, then the step will be located at the cam 18 in the preventing lever, and due to the action of the spring 19 the preventing lever will turn inwards against the ratchet wheel. Fastened to the dispensing lever 9 there is an arcuate projection 20 extending along the outer periphery of the ratchet wheel. The inwardly turned end of the preventing lever abuts the lower end of the dispensing lever projection, which prevents the movement of the lever (FIG. 4).

Figure 9:
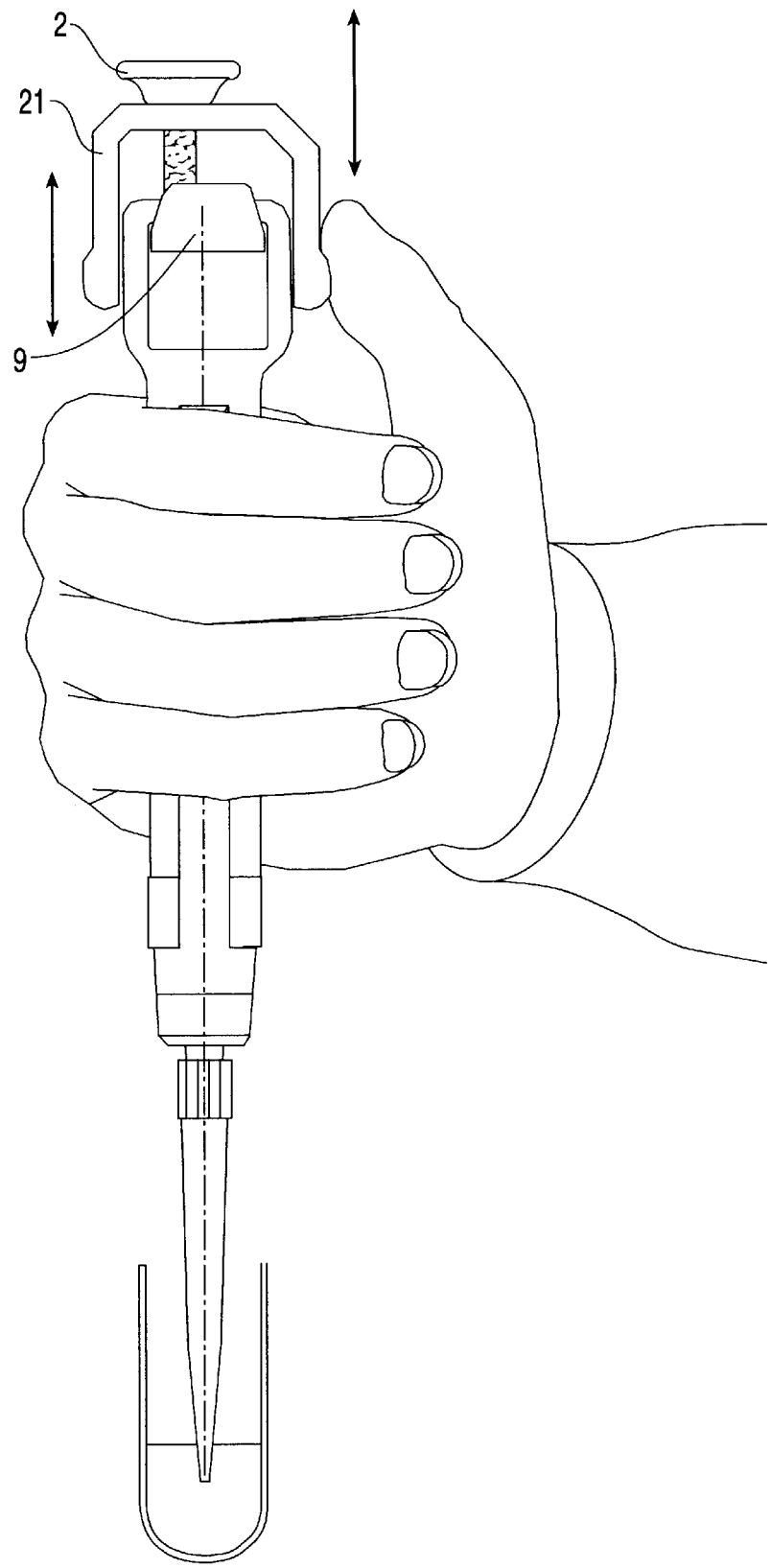
FIG. 9 shows the operation of the stepping pipette and the aeration button used in the stepping pipette.

A further additional feature is the downwards extending U-formed appendage 21 (FIG. 9) on the knob of the piston part 2 with which the piston 12 can be moved up and down with a one-handed grip during the filling step. In this manner the reservoir 4 can be aerated and dampened even with a viscous liquid, such as blood or serum.

The piston 12 is sealed against the cylinder 3 at the top of the cylinder. The sealing arrangement comprises around the piston an O-ring against the cylinder top end, and above it a flange and a spring around the piston, so that the spring with its top end resting against the body 1 will press the O-ring via the flange.

When the ratchet wheel 5 and the transmission wheel 6 are integral they can be manufactured in a single step.

The pawl 10 is further accompanied by a spring 22 which forces the pawl away from the dispensing lever 9 and against the ratchet wheel in order to ensure the engagement.

For the removal of the tip the pipette can further have an arrangement 23 with which the tip reservoir is conveniently removed without touching it manually (see e.g. the publication FI-A-770510).

The pipette body 1 is formed to suit the hand so that the dispensing lever can be used by the thumb and so that the operation of the dispensing lever 9, the control knob 13, the piston part 2 and the tip removal arrangement is as easy as possible. The body has i.a. a finger hook 24 supporting the hand.

Figure 6:
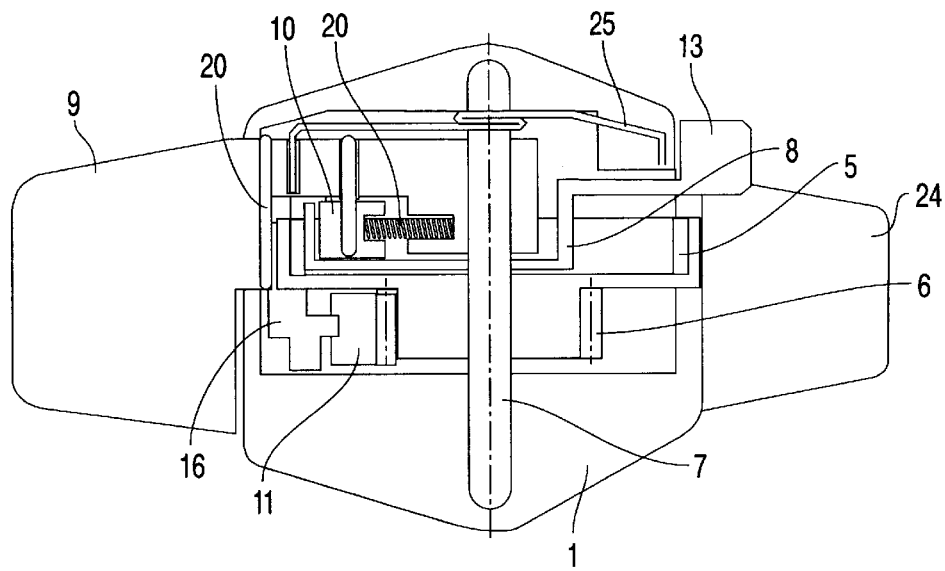
FIG. 6 shows a top view of the ratchet mechanism of FIG. 2.
Figure 7:
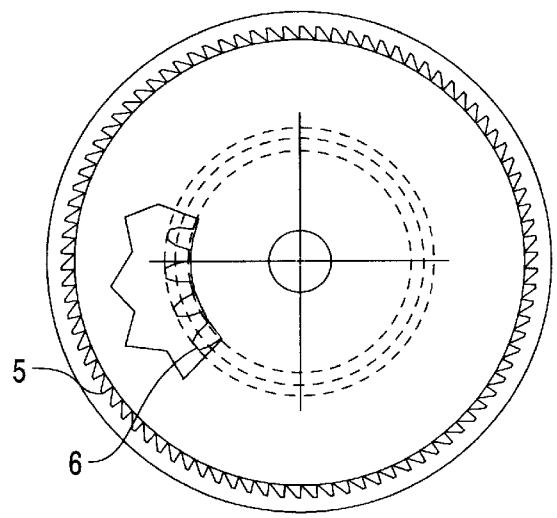
FIG. 7 shows a combined ratchet and transmission wheel.
Figure 8:
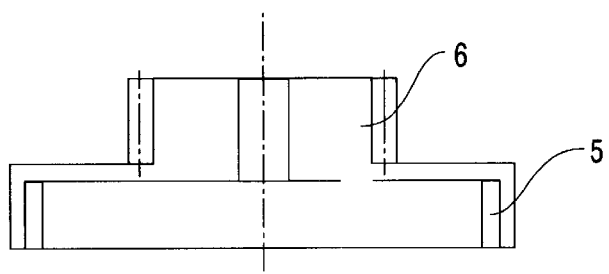
FIG. 8 shows a top view of the wheel of FIG. 7.

The dispensing lever 9 is further accompanied by a return spring 25 with one end fixed in relation to the body 1 and which forces the dispensing lever into the upper position (FIG. 6). In this manner the dispensing lever again returns to the upper position after a stroke.

We claim:

1. A ratchet pipette for drawing a volume of a liquid and dispensing the liquid in smaller volumes comprising:

a body (1);

a cylinder (3) disposed on the body;

a piston (12) positioned within the cylinder for sliding movement in a first direction to draw a first amount of liquid into the cylinder and in a second direction to dispense at least one second amount of liquid, less than said first amount;

a push rod (11) as an extension of the piston;

a first wheel (6) in engagement with the push rod so that rotation of the first wheel in one direction causes movement of the push rod in said second direction;

a second wheel (5) journaled on a shaft (7) and having a larger diameter than the first wheel and a peripheral engaging surface, said first wheel operatively connected to the second wheel for rotation therewith;

a dispensing actuator (9) contactable by a user and rotatably mounted on said shaft for movement along a predetermined path between a first position and a second position;

a pawl (10) connected to the dispensing actuator for movement therewith and drivingly contacting the engaging surface of the second wheel when the dispensing actuator moves along at least part of said path from the first position toward said second position to cause the second wheel to rotate and thus cause the first wheel to rotate to move said push rod and said piston in said second direction to dispense said second amount of liquid; and a control member (8) connected to the body and preventing contact between the pawl and the engaging surface of the second wheel during a portion of the movement of the dispensing actuator between the first and second positions.

2. The pipette according to claim 1, wherein the engaging surface of the second wheel is on an outer periphery.

3. The pipette according to claim 1, wherein the engaging surface of the second wheel is on an inner periphery.

4. The pipette according to claim 1, wherein the dispensing actuator is a lever rotatable mounted on said shaft.

5. The pipette according to claim 1, wherein the push rod is a pinion rack and the first wheel has teeth that mate with teeth of the pinion rack.

6. The pipette according to claim 1, wherein a spring having a first end attached to the dispensing actuator and a second end attached to the pawl maintains the pawl in contact with the engaging surface of the second wheel.

7. The pipette according to claim 1, wherein a return spring having a first end fixed to the body and a second end fixed to the dispensing actuator returns the dispensing lever to the second position.

8. The pipette according to claim 1, wherein the first wheel (6) and the second wheel (5) are concentrically rotated.

9. The pipette according to claim 2, wherein the first wheel (6) and the second wheel are integral.

10. The pipette according to claim 1, wherein the control member (8) has a pawl release member peripherally movable on the engaging surface of the second wheel, whereby the release member permits the downwards moving pawl to engage the engaging surface starting only at a first portion of the movement of the dispensing actuator.

11. The pipette according to claim 10, wherein the pawl release member is accompanied by a control knob (13) projecting outside the pipette and having a resilient projection abutting the pipette body, which has counterpart notches (14) for the control knob.

12. A ratchet pipette for drawing a volume of a liquid and dispensing the liquid in smaller volumes comprising:

a body (1);

a cylinder (3) disposed on the body;

a piston (12) positioned within the cylinder for sliding movement in a first direction to draw a first amount of liquid into the cylinder and in a second direction to dispense at least one second amount of liquid, less than said first amount;

a push rod (11) as an extension of the piston;

a first wheel (6) in engagement with the push rod so that rotation of the first wheel in one direction causes movement of the push rod in said second direction;

a second wheel (5) journaled on a shaft (7) and having a larger diameter than the first wheel and a peripheral engaging surface, said first wheel operatively connected to the second wheel for rotation therewith;

a dispensing actuator (9) rotatable mounted on said shaft for movement along a predetermined path between a first position and a second position; and a pawl (10) connected to the dispensing actuator for movement therewith and drivingly contacting the engaging surface of the second wheel when the dispensing actuator moves along at least part of said path from the first position toward said second position to cause the second wheel to rotate and thus cause the first wheel to rotate to move said push rod and said piston in said second direction to dispense said second amount of liquid, wherein the pipette further has an arrangement (15) to prevent the last stroke, said arrangement preventing the piston from moving in the second direction when there is less than the second amount of liquid in the cylinder.

13. A ratchet pipette for drawing a volume of a liquid and dispensing the liquid in smaller volumes comprising:

a body (1);

a cylinder (3) disposed on the body;

a piston (12) positioned within the cylinder for sliding movement in a first direction to draw a first amount of liquid into the cylinder and in a second direction to dispense at least one second amount of liquid, less than said first amount;

a push rod (11) as an extension of the piston;

a first wheel (6) in engagement with the push rod so that rotation of the first wheel in one direction causes movement of the push rod in said second direction;

a second wheel (5) journaled on a shaft (7) and having a larger diameter than the first wheel and a peripheral engaging surface, said first wheel operatively connected to the second wheel for rotation therewith;

a dispensing actuator (9) rotatable mounted on said shaft for movement along a predetermined path between a first position and a second position; and a pawl (10) connected to the dispensing actuator for movement therewith and drivingly contacting the engaging surface of the second wheel when the dispensing actuator moves along at least part of said path from the first position toward said second position to cause the second wheel to rotate and thus cause the first wheel to rotate to move said push rod and said piston in said second direction to dispense said second amount of liquid, wherein the top end of the push rod (11) projects through the upper part of the pipette as a filling knob, to which is attached an appendage (21) with which the push rod can be moved up and down by one hand when the pipette is filled.

14. A ratchet pipette for drawing a volume of a liquid and dispensing the liquid in smaller volumes comprising:

a body (1);

a cylinder (3) disposed on the body;

a piston (12) positioned within the cylinder for sliding movement in a first direction to draw a first amount of liquid into the cylinder and in a second direction to dispense at least one second amount of liquid, less than said first amount;

a push rod (11) as an extension of the piston;

a first wheel (6) in engagement with the push rod so that rotation of the first wheel in one direction causes movement of the push rod in said second direction;

a second wheel (5) journaled on a shaft (7) and having a larger diameter than the first wheel and a peripheral engaging surface, said first wheel operatively connected to the second wheel for rotation therewith;

a dispensing actuator (9) movably mounted on the body for movement along a predetermined path between a first position and a second position;

a pawl (10) connected to the dispensing actuator for movement therewith and drivingly contacting the engaging surface of the second wheel by downward movement of the pawl when the dispensing actuator moves along at least part of said path from the first position toward said second position to cause the second wheel to rotate and thus cause the first wheel to rotate to move said push rod and said piston in said second direction to dispense said second amount of liquid; and a control member (8) journaled to the shaft and preventing contact between the pawl and the engaging surface of the second wheel during a portion of the movement of the dispensing actuator between the first and second positions.

15. A ratchet pipette for drawing a volume of a liquid and dispensing the liquid in smaller volumes comprising:

a body (1);

a cylinder (3) disposed on the body;

a piston (12) positioned within the cylinder for sliding movement in a first direction to draw a first amount of liquid into the cylinder and in a second direction to dispense at least one second amount of liquid, less than said first amount;

a push rod (11) as an extension of the piston;

a first wheel (6) in engagement with the push rod so that rotation of the first wheel in one direction causes movement of the push rod in said second direction;

a second wheel (5) journaled on a shaft (7) and having a larger diameter than the first wheel and a peripheral engaging surface, said first wheel operatively connected to the second wheel for rotation therewith;

a dispensing actuator (9) movably mounted on the body for successive, repeated movement along a predetermined path between a first position and a second position;

a pawl (10) connected to the dispensing actuator for movement therewith and drivingly contacting the engaging surface of the second wheel during each successive movement of the dispensing actuator along at least part of said path from the first position toward said second position to cause the second wheel to rotate and thus cause the first wheel to rotate to move said push rod and said piston a full stroke in said second direction to dispense said second amount of liquid; and means (15) to prevent the next successive movement of the piston in said second direction when the piston cannot move said full stroke to dispense said second amount of liquid, said means including a preventing lever mounted to turn to prevent the dispensing actuator from moving from the first position.

16. The pipette according to claim 1, wherein the appendage includes a first end attached to the filling knob and a second end movably mounted on the body.

17. A ratchet pipette for drawing a volume of a liquid and dispensing the liquid in smaller volumes comprising:

a body (1);

a cylinder (3) disposed on the body;

a piston (12) positioned within the cylinder for sliding movement in a first direction to draw a first amount of liquid into the cylinder and in a second direction to dispense at least one second amount of liquid, less than said first amount;

a push rod (11) as an extension of the piston;

a first wheel (6) in engagement with the push rod so that rotation of the first wheel in one direction causes movement of the push rod in said second direction;

a second wheel (5) journaled on a shaft (7) and having a larger diameter than the first wheel and a peripheral engaging surface, said first wheel operatively connected to the second wheel for rotation therewith;

a dispensing actuator (9) movably mounted on the body for movement along a predetermined path between a first position and a second position;

a pawl (10) connected to the dispensing actuator for movement therewith and drivingly contacting the engaging surface of the second wheel when the dispensing actuator moves along at least part of said path from the first position toward said second position to cause the second wheel to rotate and thus cause the first wheel to rotate to move said push rod and said piston in said second direction to dispense said second amount of liquid; and preventing means to prevent movement of the dispensing actuator from the first position when said piston cannot move sufficiently far in said second direction to dispense said second amount of liquid, said preventing means including a preventing member (16) mounted on said body for movement into said predetermined path to prevent the dispensing actuator from moving from said first position.

18. A ratchet pipette for drawing a volume of a liquid and dispensing the liquid in smaller volumes comprising:

a body (1);

a cylinder (3) disposed on the body;

a piston (12) positioned within the cylinder for sliding movement in a first direction to draw a first amount of liquid into the cylinder and in a second direction to dispense at least one second amount of liquid, less than said first amount;

a push rod (11) as an extension of the piston;

a first wheel (6) in engagement with the push rod so that rotation of the first wheel in one direction causes movement of the push rod in said second direction;

a second wheel (5) journaled on a shaft (7) and having a larger diameter than the first wheel and a peripheral engaging surface, said first wheel operatively connected to the second wheel for rotation therewith;

a dispensing actuator (9) movably mounted on the body for movement along a predetermined path between a first position and a second position; and a pawl (10) connected to the dispensing actuator for movement therewith and drivingly contacting the engaging surface of the second wheel when the dispensing actuator moves along at least part of said path from the first position toward said second position to cause the second wheel to rotate and thus cause the first wheel to rotate to move said push rod and said piston in said second direction to dispense said second amount of liquid, wherein a top end of the push rod projects through an upper part of the pipette as a filling knob, to which is attached an appendage (21) with which the push rod can be moved in the first and second directions by one hand engagement with the appendage when drawing the first amount of liquid into the cylinder.

* * * * *